Nov. 24, 1942.   R. DENSON   2,302,940
CONNECTING ROD SAFETY APPLIANCE FOR SWITCHES
Filed Sept. 23, 1941   2 Sheets—Sheet 1
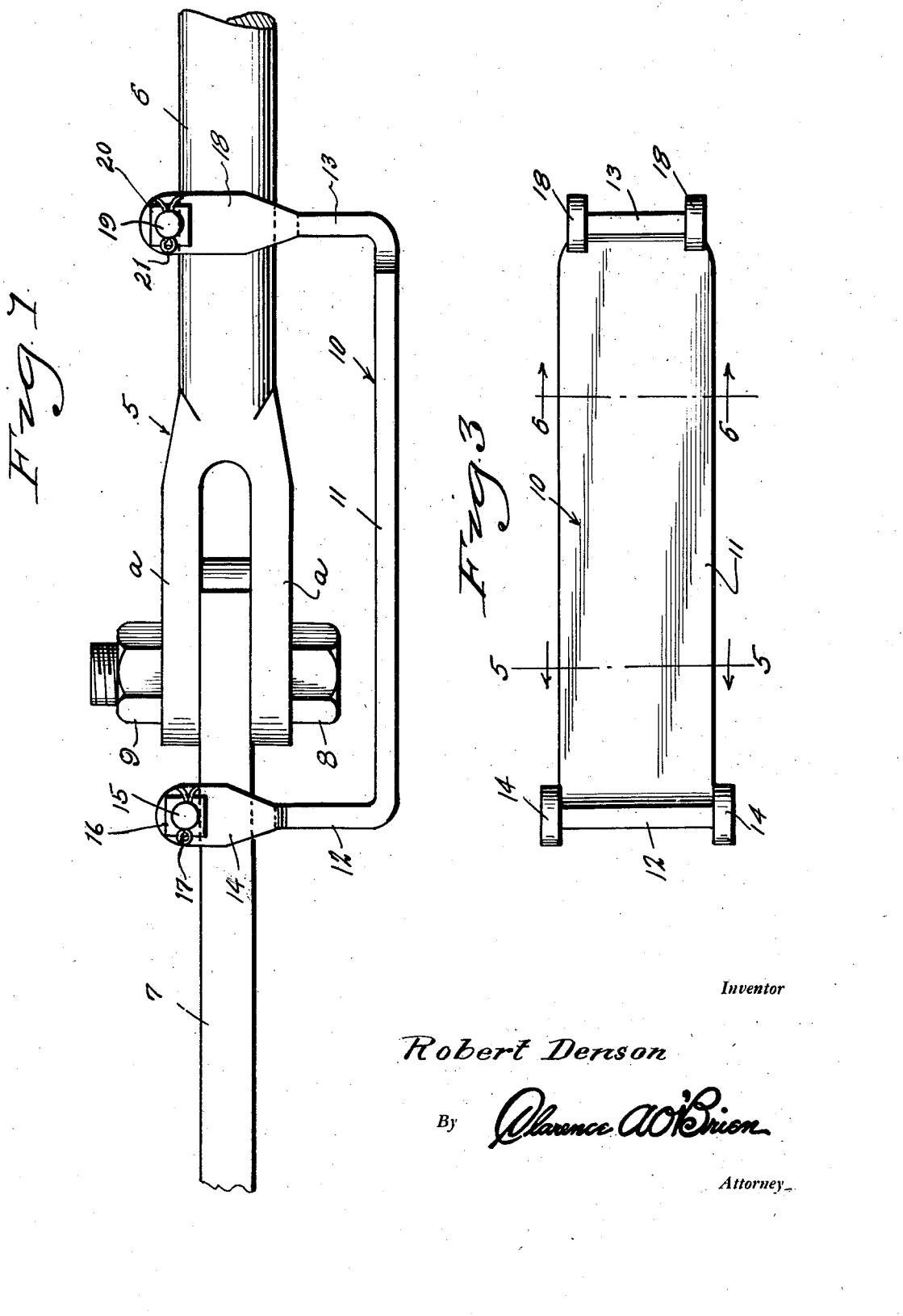
Inventor
Robert Denson
By  Clarence A. O'Brien
Attorney Nov. 24, 1942.   R. DENSON   2,302,940
CONNECTING ROD SAFETY APPLIANCE FOR SWITCHES
Filed Sept. 23, 1941   2 Sheets-Sheet 2
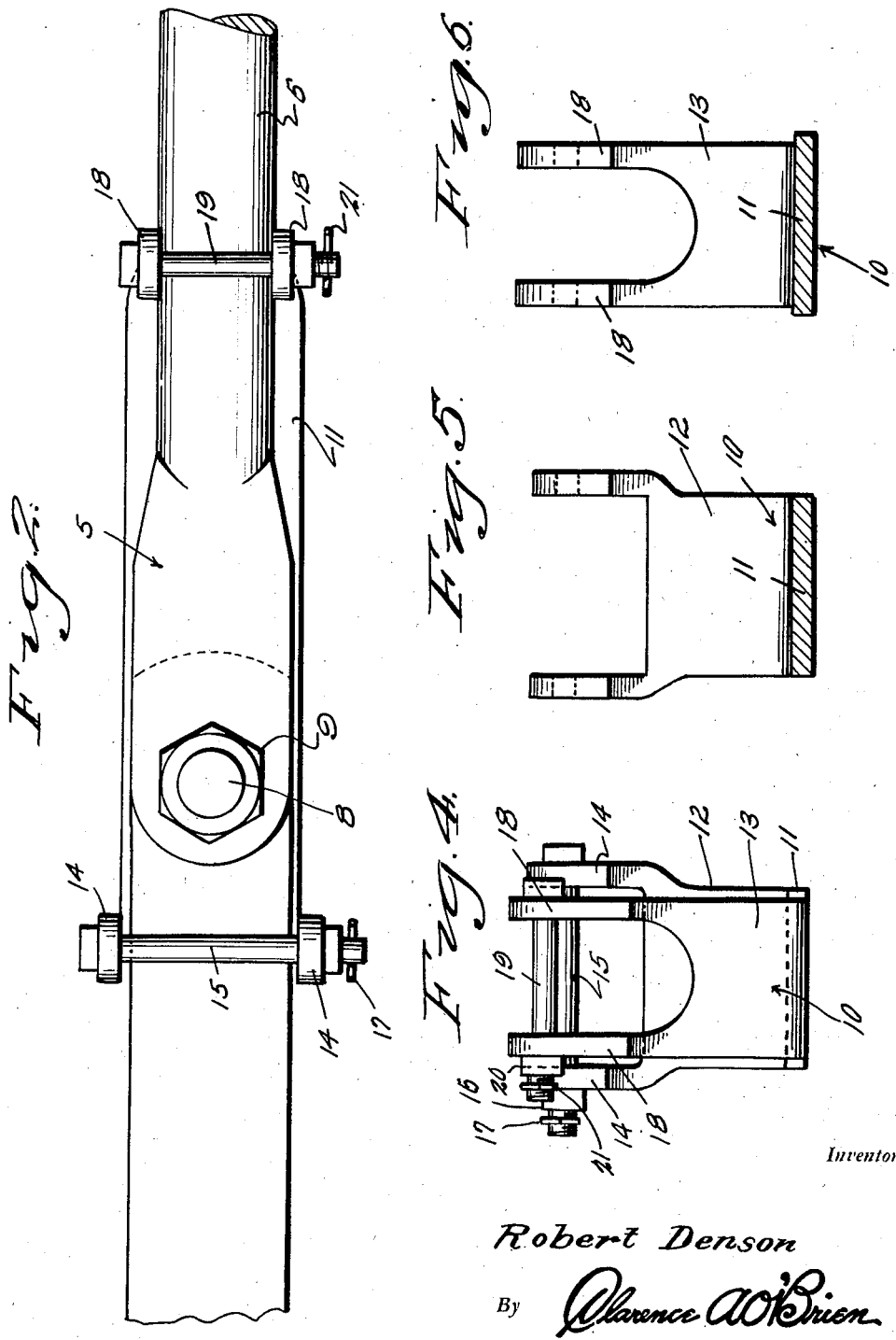

Patented Nov. 24, 1942

2,302,940

UNITED STATES PATENT OFFICE 2,302,940

CONNECTING ROD SAFETY APPLIANCE FOR SWITCHES

Robert Denson, Clinton, Ill., assignor of forty per cent to Emerson M. Williams, Clinton, Ill.

Application September 23, 1941, Serial No. 412,041

1 Claim. (Cl. 287—1)

This invention relates to new and useful improvements in railway switches and more particularly to a safety appliance for the connecting rods of switches.

The principal object of the present invention is to provide a safety pipe which will prevent the loss of the usual bolt which connects the sections of the connecting rod in the event the nut comes off.

Other objects and advantages of the invention will become apparent to the reader of the following specification.

In the drawings:

Figure 1 represents a fragmentary side elevational view.

Figure 2 is a top plan view.

Figure 3 is a top plan view of the appliance.

Figure 4 is an end elevational view of the appliance.

Figure 5 is a cross-section on line 5—5 of Figure 3.

Figure 6 is a cross-section on line 6—6 of Figure 3.

Referring to the drawings wherein like numerals designate like parts, it can be seen that numeral 5 generally refers to a conventional connecting rod consisting of sections 6, 7, one end of the section 6 being bifurcated and having its furcations a, a straddling one end of the section 7. The furcations a, a and the adjacent end of the section 7 have registering openings to receive a bolt 8 which is disposed upwardly through the openings and at its upper end equipped with a nut 9.

The safety appliance is generally referred to by numeral 10 and comprises an elongated plate 11 having upstanding end walls 12, 13. The end wall 12 has upstanding legs 14, 14 which straddle the connecting rod section 7 and a bolt 15 extending through the upper ends of these legs 14, 14 above the section 7 is equipped with a nut 16 and a cotter key 17.

The other wall 13 has somewhat longer upstanding legs 18, 18 which are bridged by a bolt 19 equipped with a nut 20 and a cotter key 21. This bolt 19 extends above the connecting rod section 6.

It can now be observed that with the bolts 15, 19 in place and the plate 11 just below the bolt 8, in the event the nut 9 becomes displaced, the bolt cannot fall from the connecting rod and will remain in a position holding the connecting rods connected until a trackman notices the absence of the nut which of course can be quickly replaced.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In combination, a connecting rod including a pair of aligned sections one having a bifurcated end and the other having an end fitted in the bifurcated end, a bolt connecting said sections together at said ends thereof and disposed head downward, an elongated plate disposed beneath said sections and under the head of said bolt, and means for securing the ends of the plate to said sections comprising pairs of legs projecting from the ends of the plate and straddling the sections upon opposite sides of the connecting bolt, bolts disposed through said pairs of legs and extending over said sections, said plate being spaced from said head of the connecting bolt a distance less than that from the tail end of the connecting bolt to the nearest side face of said bifurcated end when the connecting bolt is in its assembled position.

ROBERT DENSON.